United States Patent [19]

Jordan

[11] 4,187,426
[45] Feb. 5, 1980

[54] LIQUID SCINTILLATION SPECTROMETRY PROCESS AND APPARATUS

[76] Inventor: Pierre Jordan, Carmenstr. 41, CH-8032 Zurich, Switzerland

[21] Appl. No.: 889,885

[22] Filed: Mar. 24, 1978

[51] Int. Cl.² .................................................. G01T 1/20
[52] U.S. Cl. ...................................... 250/364; 250/252; 250/328
[58] Field of Search ........... 250/328, 252, 364, 361 R, 250/369

[56] References Cited

U.S. PATENT DOCUMENTS

4,085,325 4/1978 Atallah et al. ........................ 250/328

Primary Examiner—Davis L. Willis
Attorney, Agent, or Firm—Frishauf, Holtz, Goodman & Woodward

[57] ABSTRACT

The invention relates to a liquid scintillation spectrometry process and apparatus permitting the analysis of samples having a quenching of the fluorescent efficiency resulting both from a color quenching and a chemical quenching. The invention makes it possible to measure a parameter B which gives the respective contributions of the two quenching types. According to the invention, parameter B is obtained in the following manner. A scintillation radiation produced by a standard fluorescent source placed in the vicinity of the sample to be measured is passed through the latter. This source comprises, for example, a solid scintillator exposed to an alpha or beta radiation source. The scintillation emitted by the standard source supplies an amplitude spectrum which is measured. One of the significant characteristics of this spectrum is determined, for example, the ratio of the counting rates in two different channels. This ratio gives parameter B. With respect to the parameter determining the overall quenching of the sample G, it is determined as in per se known methods by using a standard gamma source and the ratio of the counting rates in the two channels of different energies is then measured. The knowledge of the two parameters B and G makes it possible to accurately determine the fluorescent efficiency and consequently correct the spectrometers.

19 Claims, 10 Drawing Figures

LIQUID SCINTILLATION SPECTROMETRY PROCESS AND APPARATUS

BACKGROUND OF THE INVENTION

The present invention relates to a liquid scintillation spectrometry process and apparatus permitting the analysis of samples having a quenching of the fluorescence efficiency resulting from both a colour quenching and a chemical quenching.

It is known that one of the disadvantages of liquid scintillation spectrometry is the quenching of the fluorescence efficiency (number of fluorescence photons emitted per unit of energy dissipated in the scintillator) which generally leads to a reduction in the measuring efficiency (number of pulses counted per unit of time for a given sample). This reduction cannot be calculated because it is dependent on a large number of parameters, many of which are not known at the time of measuring. It is therefore necessary to determine it experimentally for each sample.

A large number of processes have been suggested for this purpose. One for example consists of the use of an external standard radioactive source, whereby a supplementary measurement of the spectrum induced by it is performed in the sample. It is possible to determine the overall quenching of the sample by measuring the relationship of the counting rates in two different energy channels.

Another process is known which uses a standard external radioactive source and which no longer consists of merely measuring the quenching and instead also automatically corrects the sensitivity of the spectrometer in order to compensate this effect. The latter process formed the object of U.S. Pat. No. 3,560,744 granted to T. Jordan on Feb. 2, 1971 and entitled "Method and apparatus for compensating of quenching in liquid scintillation counting", the latter patent being considered as incorporated into the present description.

However, these correction methods are only accurate if the fluorescence quenching is not due both to chemical quenching and colour quenching. In this case the fluorescence efficiency of the solution is dependent on the respective contributions of these two effects in such a way that if said contributions are unknown, it is impossible to make a precise correction of the counting rate.

In order to facilitate the description which follows, it is pointed out that the term chemical quenching designates a phenomenon which leads to a reduction in the number of photons emitted by a liquid scintillator under the action of chemical agents, so-called quenchers, present in the solution. It is also pointed out that colour or chromatic quenching is a phenomenon which leads to a reduction in the number of photons reaching the detection means due to their partial absorption on passing through the liquid scintillator.

Thus, chemical quenching is due to a molecular process which occurs at the point of fluorescent radiation emission, whilst colour quenching occurs after said emission.

The necessity of taking separate account of these two types of quenching has already been noted. In his article entitled "Chemical vs. Color Quenching in Automatic External Standard Calibration; Application of Empirical Observations in a Computer Program" appearing on pages 823 to 833 of the work entitled "Organic Scintillators and Liquid Scintillation Counting" edited by D. L. Horrocks and Chin-Tzu Teng, 1971, Academic Press, the author, J. F. Lang, proposes an empirical method based on the use of four calibration equations established on the basis of a number of standard samples. These equations then make it possible to determine the true counting efficiency for each sample having colour and chemical quenchings in unknown proportions.

This question was again dealt with in the article by P. E. Stanley entitled "Fundamental Approaches for the Assessment of Chemical and Color Quenching in Backgrounds and Samples" published in the work "Liquid Scintillation Counting", 3, 1974, pp. 65–75, edited by M. A. Crook and P. Johnson.

In order to reduce the error made in conventional counting processes, a so-called "least amplitudes" analytical method was proposed which is described in the article by C. Ediss et al entitled "Lesser Pulse Height Analysis in Liquid Scintillation Counting" edited by P. E. Stanley and B. A. Scoggins, Academic Press, 1974, pp. 91–101. According to this process, instead of summating the pulses of each of the two photomultipliers for each scintillation as in conventional processes, only the smallest of the two pulses is used for each scintillation. Experience has shown that the calibration curves obtained with an external gamma source are much closer to one another for the two quenching types than in the case when pulse summation is used.

However, even with the latter process a difference exists and in addition pulse height statistics suffer from the reduced number of photoelectrons released at the cathodes of the photomultipliers, particularly in the case of scintillations caused by low energy beta-emitters such as, for example, H3.

Finally, reference can be made to the article by M. Takiue and H. Ishikawa entitled "Quenching Analysis of Liquid Scintillation" published in the Journal "Nuclear Instruments and Methods", 118, 1974, pp. 51–54 and this article is considered to be incorporated into the present description.

BRIEF SUMMARY OF THE INVENTION

The invention therefore relates to a liquid scintillation spectrometry process which unlike the prior art processes indicated hereinbefore permits the determination of the colour quenching proportion affecting a sample.

The invention also relates to a process which permits when the colour quenching has been determined to determine the chemical quenching proportion.

The invention also has for its object a process permitting the automatic correction of the spectrometric means in order to separately compensate fluorescence quenching due to both colour and chemical quenching.

The invention also relates to a liquid scintillation spectrometric apparatus comprising means for determining the colour quenching proportion affecting a sample. The invention also relates to an apparatus comprising means for determining the chemical quenching proportion.

Finally, the invention relates to a liquid scintillation spectrometric apparatus comprising means such that its sensitivity is automatically corrected as a function of the colour and chemical quenchings.

According to the invention, the above objects are achieved by effecting a supplementary spectrometry using a standard external scintillation source which emits fluorescent radiation which is directed through the sample to be measured.

More specifically, the process of the invention comprises the following sequence of operations:
- a first standard solution is prepared having no colour quenching;
- this first standard solution is exposed to a first standard external scintillation source which emits fluorescent radiation;
- the radiation which has passed through the first standard solution is subject to spectrometry;
- once and for all, one of the characteristics of the spectrum obtained is recorded and this constitutes a reference characteristic;
- the first standard solution is replaced by one of the samples to be measured;
- the sample is exposed to radiation from the first standard source;
- the radiation which has passed through the sample is subject to spectrometry;
- the characteristic of the spectrum obtained is measured;
- the measured characteristic is compared with the recorded reference characteristic, said comparison giving the colour quenching of the sample.

The variant of the process which also permits the determination of the chemical quenching proportion affecting a sample involves a measurement of the overall quenching of the sample by either an external (with the aid of a second external source which emits ionising radiation) or internal (by measuring the counting rates of, for example, C-14 in two channels) overall calibration.

To separately correct the effects of colour and chemical quenching either calibration or automatic compensation is used.

The liquid scintillation spectrometer according to the invention permitting the separate determination of the colour quenching and the chemical quenching is of the type comprising the following means:
- a measuring chamber;
- means for introducing the samples to be measured successively into the said chamber;
- a spectrometry system comprising at least one photomultiplier positioned in front of said chamber and supplying pulses directed towards a counting circuit with several different energy channels;
- a circuit for measuring one of the characteristics of the spectrum measured by the spectrometry system, said circuit supplying a measuring voltage;

this apparatus also comprises:
- a first standard scintillation source emitting fluorescent radiation which is associated with means for introducing the radiation into the measuring chamber;
- a first standard solution having no colour quenching;
- a first regulatable reference voltage generator which can be regulated to supply a first reference voltage equal to that supplied by the measuring circuit when the first solution is exposed to the first standard source;
- a first comparator with two inputs, one being connected to the first reference voltage generator and the other to the measuring circuit, said comparator supplying a signal which is directly linked with the colour quenching;
- a standard source emitting an ionising radiation associated with means for introducing said source into the measuring chamber;
- a second standard solution having no quenching;
- a second regulatable reference voltage generator being regulated to supply a second reference voltage identical to that supplied by the measuring circuit when the second standard solution is exposed to the second standard source;
- a second comparator with two inputs, one connected to the second reference voltage generator and the other to the measuring circuit, said second comparator supplying a signal which is directly linked with the overall quenching of the sample.

BRIEF DESCRIPTION OF THE DRAWINGS

The invention will be described in greater detail hereinafter relative to non-limitative embodiments and with reference to the attached drawings, wherein show.

DETAILED DESCRIPTION OF THE PREFERRED EMBODIMENTS

Figure 1:
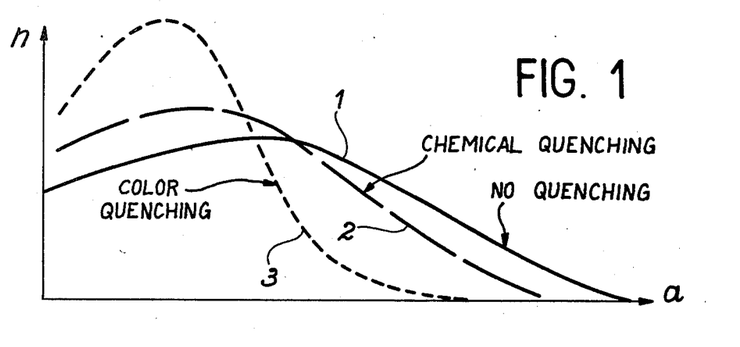
FIG. 1, a gamma-scintillation spectrum in the absence of any quenching and in the presence of chemical quenching and colour quenching.
Figure 2:
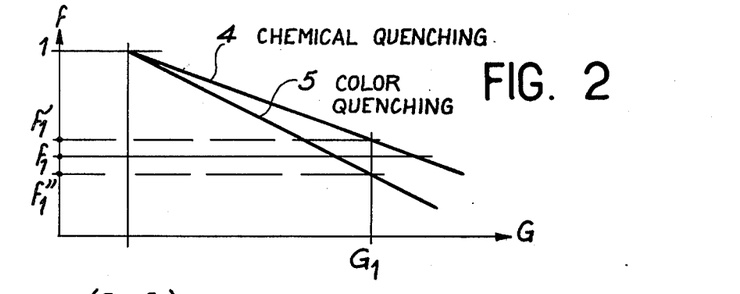
FIG. 2, two external standardisation curves giving the measuring efficiency as a function of the quotient of the counting rates obtained in two different channels, one obtained in the case of purely chemical quenching and the other in the case of purely colour quenching.

FIG. 1 shows a beta-scintillation spectrum, i.e. the statistical distribution of n-detected pulses having a given amplitude a in the absence of any quenching (curve 1) in the presence of chemical quenching (curve 2) and in the presence of colour quenching (curve 3). The difference in the changes made by the two quenching types to the pulse spectrum of the radioactive nuclide contained in the sample on the one hand, and to the pulse spectrum produced by the action of the external gamma-source on the sample on the other, is the cause of the variations observed between the external standardisation curves relative to chemical quenching and colour quenching. These curves are shown in FIG. 2 where the measuring efficiency f (taken as unity in the absence of quenching) is shown as a function of the quotient G of the counting rates obtained with an external gamma-source in two different energy channels. Curve 4 is the external standardisation curve relative to chemical quenching only and curve 5 that relating to colour quenching only.

When in the case of a sample having both quenching types the external standardisation process gamma gives a value $G_1$ for the quotient of the counting rates, this means that the fluorescence efficiency $f_1$ of the sample is between the two limits $f_1'$ and $f_1''$ corresponding respectively to cases of purely chemical quenching and purely colour quenching. The precise value of the efficiency is dependent on the respective contributions of the said two types of quenching. Failure to know the exact relationship between these contributions therefore leads to uncertainty regarding the true value of the fluorescence efficiency and consequently leads to a measuring error.

The object of the present invention is to permit the measurement of a second parameter designated by B (the first being the ratio G) permitting the determination of the respective contribution of the two types of quenching. The second parameter varies between a first value and a second value when quenching passes gradually from the purely chemical type to the purely colour type. The knowledge of the parameters G and B thus makes it possible to determine the precise value of the measuring efficiency for any sample subject to both chemical and colour quenching.

According to the present invention, the parameter B is obtained in the following manner. Scintillation radiation produced by a standard fluorescent source located in the vicinity of the sample to be measured is passed through the said sample. The source comprises, for example, a solid scintillator exposed to an alpha or beta-radiation source. The scintillations emitted by the standard source supply an amplitude spectrum which is measured. One of the significant characteristics of this spectrum is determined, for example, the ratio of the counting rates in the two different channels. It is this ratio which gives the parameter B. It in fact constitutes a measurement of the colour quenching of the sample because the scintillations measured escape chemical quenching because they are produced outside the sample so that they are only affected by the colour quenching of the sample.

With respect to the parameter G which determines the overall quenching of the sample, it is determined as in the per se known methods either by an internal standardisation or by an external standardisation using a gamma-standard source and measuring the ratio of the counting rates in two different energy channels. The detailed sequence of these operations will be described hereinafter in the case of an external standardisation.

The exploitation of parameters B and G can be effected in two different ways, namely by calculation which gives access to the measuring efficiency and permits the correction consequently and subsequently of the measuring results, or by automatic adjustment of an instrument parameter permitting the compensation of the fluorescence quenching at the time of the measurement. These two methods will now be described.

The determination of the measuring efficiency from parameters B and G assumes the knowledge of the calibration functions which can be obtained by prior calibration with numerical or graphical recording. For purposes of explanation it is assumed hereinafter that recording is graphical.

The calibration operation is performed by measuring a series of calibration samples formed solely with this purpose in mind. These samples firstly contain an appropriate quantity of the radioactive nuclide which is to be measured in the working samples. They also contain known quantities which differ from one sample to the next of a purely chemical quencher on the one hand and a purely colour quencher on the other. For example, reference is made in connection with the first quencher to acetone or acetaldehyde and for the second to methyl orange or tar. In addition, the articles referred to hereinbefore give other substances which can be used as colour or chemical quenchers.

It facilitates matters to consider all the calibration samples as constituted by series each commencing with a sample which only contains the chemical quencher, the quantities I (or the concentration) of said quencher increasing from the beginning of one series to the next, i.e. $I_0$ for the first, $I_1$ for the second, $I_2$ for the third and so on.

If J is used to designate the quantity (or concentration) of colour quencher, a complete series is obtained by adding increasing quantities of a colouring agent to a standard at the start of the series which gives, for example, for the first series $(I_0, J_0)$, $(I_0, J_1)$, $(I_0, J_2)$, etc.

Figure 3:
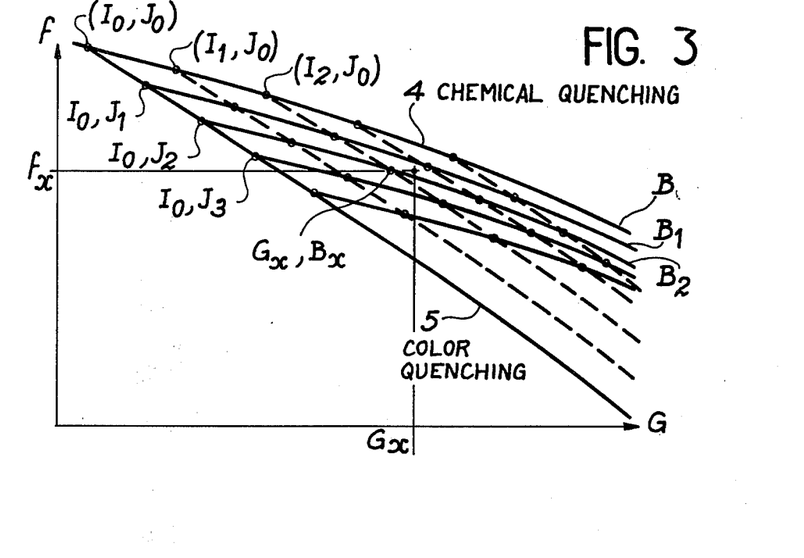
FIG. 3, a system of external calibration curves.

A measurement of the relationship of the counting rates is made with each of the two standard sources for all the samples and this determines the two parameters B and G. This measurement makes it possible to place the same number of points as there are samples in a plane representative of the efficiency f as a function of the ratio G obtained with the gamma-source, and of the ratio B taken as the parameter. This system of points is shown in FIG. 3. It is readily apparent that the variation between the external curves 4 and 5 relative to purely chemical quenching and purely colour quenching have been greatly exaggerated in FIG. 3 in order to facilitate reading of the graph.

As it is a question of determining the efficiency f as a function of the parameters B and G, it is useful to trace in such a diagram the "isochromatic" curves, i.e. the curves passing through the points relative to the samples corresponding to a same value of B (or containing a same quantity of colouring agent). These isochromes are plotted in solid lines in FIG. 3 and are specifically curves $B_0$, $B_1$, $B_2$. The "series" connecting the points corresponding to samples contain a same quantity of chemical quencher are plotted in broken lines.

For any sample characterised by the coefficients $G_x$ and $B_x$ it is possible by means of such a system of curves to read (generally by effecting an interpolation between the sampling points) the efficiency value $f_x$, $G_x$ being read on the axis of the abscisses and $B_x$ serving as the parameter.

It is obvious that if it is possible to determine the measuring efficiency of a sample by simply reading on a graph in the manner described hereinbefore, it is also possible to operate automatically by means of a microprocessor in which the calibration results have been previously stored in digital form.

The process described hereinbefore makes it possible to determine the measuring efficiency of a sample and therefore makes it possible to subsequently correct the result of a measurement. However, it is also possible to exploit two parameters B and G by automatically acting on an instrument parameter in order to compensate the quenching of the sample to be measured in the manner described hereinafter.

This variant of the process according to the invention is essentially characterised by the following operations. In order to carry out spectrometry a system with regulatable sensitivity is used, for example a system with two photomultipliers supplied with a regulatable voltage, acting on said sensitivity (under the circumstances on the high voltage) to compensate the effects of colour quenching and then chemical quenching. Thus, on subsequently effecting the spectrometry of the samples to be measured the spectrometry system has a sensitivity which has been modified to take account of said quenchings. Thus, the measurement result is automatically corrected.

Figure 4:
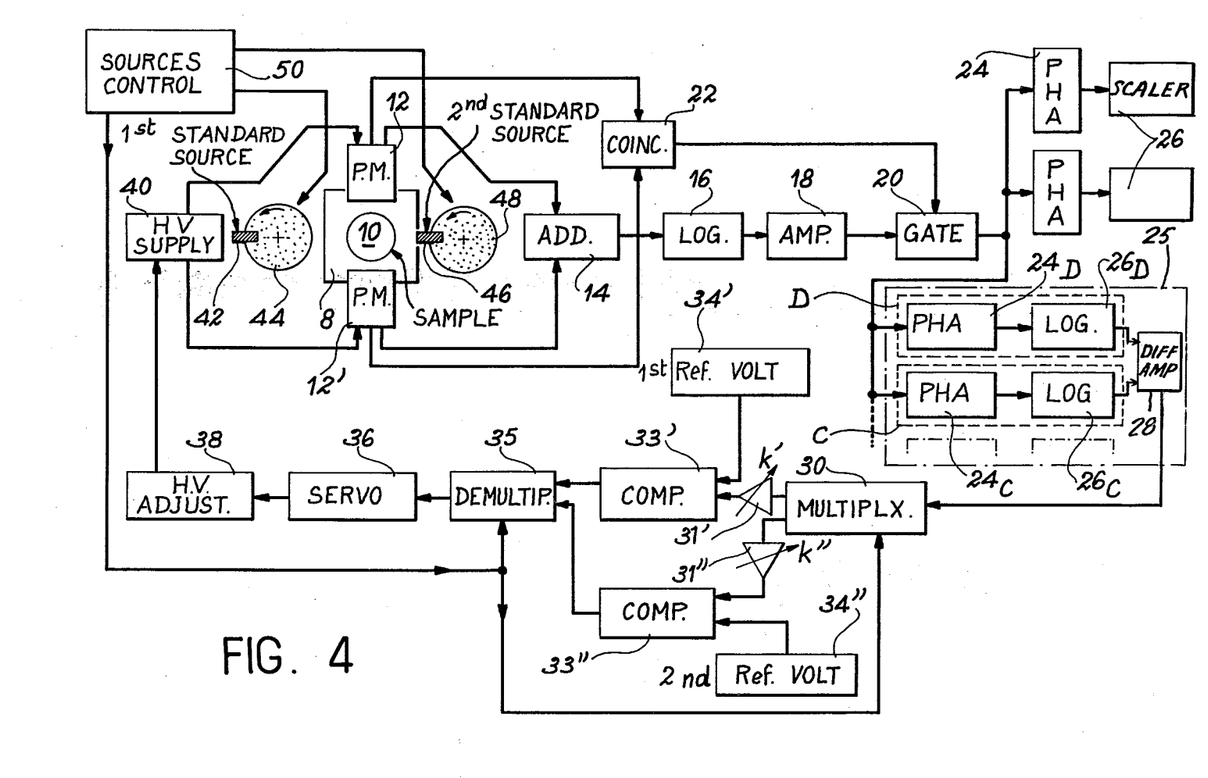
FIG. 4, a circuit diagram of the spectrometer according to the invention in the variant where the effects of chemical and colour quenching are automatically compensated by the action on the high voltage applied to the photomultipliers.

With respect to FIG. 4, a description will now be provided on the means which make it possible to carry out these operations. Certain means have already been described in U.S. Pat. No. 3,560,744 and reference can be made thereto.

The liquid scintillation spectrometer shown in FIG. 4 is of the coincidence type. It comprises a camera obscura 8 having a location for receiving the samples 10, specifically either the samples to be measured or the calibration samples. The scintillations produced in the sample are detected by two coincidence-mounted photomultipliers 12 and 12'. The signals from these two photomultipliers are summated in a circuit 14 which acts on a logarithmic amplifier 16 followed by a linear amplifier 18. The output of amplifier 18 is connected to a gate circuit 20 controlled by a coincidence circuit 22 which opens the gate or when signals are simultaneously transmitted by the two photomultipliers 12 and 12'.

The output of gate 20 is connected to a series of channels of random number and in parallel, each constituted by a pulse height analyser 24 and a counting rate meter or scaler 26. Each of these channels is used for measuring the activity of different radioactive elements (tritium, carbon 14, phosphorus 42) contained in a sample. All these circuits are of a conventional nature and are well known to the skilled expert.

The spectrometer also comprises a circuit 25 which is able to supply a significant characteristic of the spectrum. In the present variant this circuit is based on the measurement of the relationship of the counting rates in two different energy channels.

This measurement has the following significance. It is known and as has been stated hereinbefore relative to FIG. 1, fluorescence quenching leads to a sliding of the amplitude spectrum which modifies the ratio of the counting rates obtained in two different energy channels. The modification of this ratio therefore permanently reflects the fluorescence quenching. The ratio of the counting rates constitutes a privileged quantity in two respects, namely it is representative of the fluorescence efficiency and is little dependent on the instrument conditions.

The measuring circuit 25 for this ratio therefore comprises two channels C and D each provided with a pulse height analyser 24C and 24D and a logarithmic counter 26C and 26D. The two counters are connected to a differential amplifier 28 which supplies a voltage which is a function of the ratio of the counting rates in channels C and D.

Without passing beyond the scope of the invention, it would naturally be possible to measure a characteristic of the spectrum other than the ratio of the counting rates in the two different channels, for example the counting rate in a clearly defined energy channel in which case the measuring circuit would merely comprise a single analyser 24 and a single counter 25.

In the illustrated variant the differential amplifier 28 is connected to a multiplexer 30 which directs the signal towards one of the two comparison routes. The first of these routes comprises a variable gain amplifier 31', a comparator 33' which differentiates a voltage supplied by circuit 28 and a reference voltage supplied by a manually regulatable generator 34'. The second route comprises in identical manner a variable gain amplifier 31", a comparator 33" and a generator 34" supplying a second reference voltage.

The error signals by the comparators are directed towards a demultiplexer 35, whereby one or other of the signals acts on a servomotor 36 which operates a potentiometer 38 which regulates the high voltage supplied by a power supply 40 associated with two photomultipliers 12 and 12', this applying until the error has been reduced to zero.

The illustrated apparatus also comprises a first standard scintillation source 42 emitting fluorescent radiation, being constituted, for example, by a solid scintillator exposed to an alpha or beta-radioactive nuclide. It is mounted on a rotary disc 44 making it possible to move towards or away from a sample located in the measuring chamber.

A second standard source 46 which emits ionising radiation (for example a gamma source) is disposed on a second disc 48 which permits it to move towards or away from the sample.

A random means 50 can be provided for actuating one or other of the two discs 44 and 48 and also therefore for acting on multiplexer 30 and demultiplexer 35 so that when the first source is in the working position one of the routes, for example, that comprising circuits 33' and 34' is in circuit and that when the second source is in the working position the other route formed by circuits 33" and 34" is in circuit. However, it is obvious that these various operations can also be performed manually by the operator.

Obviously the installation of the sources of the rotary discs is only given here for illustrative purposes and other systems can be used, such as for example retractable rod systems.

The apparatus functions in the following manner:
a first standard solution is formed having no colour quenching;
this first solution is placed in measuring chamber 8 and is exposed to the first source 42, the second standard source 46 being withdrawn;
the ratio of the scintillation counting rates in two channels C and D of different energies is measured;
the voltage supplied by circuit 25 is recorded once and for all in generator 34', whilst acting on the latter so that signal supplied at the output of comparator 33' is zero;
the standard solution is replaced by one of the samples to be measured which is then exposed to the first standard source 42;
the ratio of the counting rates obtained in channels C and D is then measured;
the voltage supplied by circuit 25 is compared in comparator 33' with the reference voltage supplied by generator 34';
the sensitivity of the spectrometry system is automatically corrected by the error signal supplied by comparator 33' which acts on circuits 36, 38 and 40, the latter modifying the high voltage applied to the photomultipliers until the output signal of the comparator 33' is zero;

a second standard solution is then formed having no chemical quenching and it is placed in the measuring chamber;

the second standard solution is exposed to the second standard source 46 which emits ionising radiation, the first source 42 being withdrawn;

the ratio of the counting rates in the two channels of different energies C and D is measured;

the voltage supplied by circuit 25 is recorded and for this purpose generator 34'' is regulated so that the output of comparator 33'' is zero;

the second standard solution is replaced by one of the samples to be measured, this sample then being exposed to the ionising radiation of the second standard source 46;

the ratio of the counting rates in the two channels C and D is then measured;

the voltage supplied by circuit 25 is compared with the reference voltage supplied by generator 34'' and for this purpose comparator 33'' is used;

the sensitivity of the spectrometry system is corrected by the signals supplied by comparator 33'' which acts on circuits 36, 38 and 40, the latter modifying the high voltage applied to the photomultipliers until the output signal from comparator 33'' is cancelled out;

the second standard source 46 is removed.

Thus, the apparatus is doubly corrected of the effects of colour and chemical quenching. Consequently the spectrometry of the sample can be effected with the aid of a system of measuring channels and the spectrum obtained is free from quenching effects.

On passing to another sample, there is no need to regulate generators 34' and 34''. It is merely necessary to carry out a first external standardisation with the first source 42 and then a second external standardisation with the second source 46.

In practice the counting rates involved in the calibration operations are frequently only obtained after deducing the contribution of the sample in a particular channel according to a known method.

Compensation of the quenching due to the absorption of fluorescence photons is only perfect if the average optical path lengths of the photons produced in the sample on the one hand and the photons of the external source on the other are identical. If this is not the case the cancelling of the error signal either leads to overcompensation or under-compensation. It is therefore useful to provide a supplementary circuit which makes it possible to correct this error. Such a circuit can comprise a variable gain amplifier 31' which is variable around the value 1 and which is, for example, located at the output of multiplexer 30. This amplifier is regulated to gain 1 for recording the reference voltage and is then regulated to a value k' which is slightly higher or lower than 1 prior to the comparison of the measuring signal with the reference signal.

The same applies regarding the second stage of the correction for which it may be advantageous to use a second variable gain amplifier 31'' whose gain is regulated either to unity for recording the second reference voltage or to a value k'' which is slightly higher or lower than unity for comparison purposes.

Figure 5:
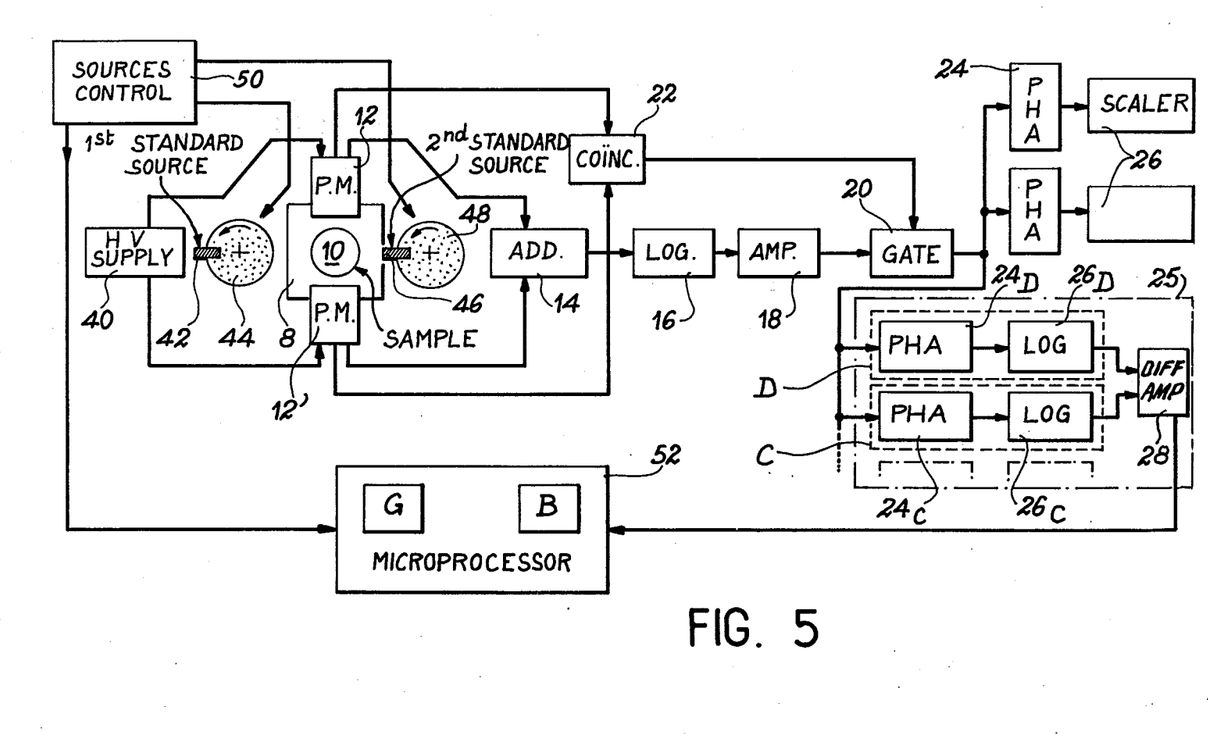
FIG. 5, a circuit diagram of the spectrometer according to the invention is the variant where the chemical and colour quenching values are automatically displayed.

FIG. 5 represents a variant of the spectrometer according to the invention in which the coefficients B and G characterising the quenching effects of a sample are displayed. The components of the spectrometry system which have already been shown in FIG. 4 carry the same references in FIG. 5. The special feature of the system of FIG. 5 is that instead of using two comparison routes and one automatic modification means for the high voltage applied to the photomultipliers, a microprocessor 52 is used which receives the voltage supplied by circuit 25, i.e. the ratio of the counting rates when the sample is exposed to each of the standard sources in succession. The microprocessor calculates the values of parameters B and G from a prior calibration carried out once and for all and which are memory-stored in the manner indicated hereinbefore.

In the previous description channels 24C, 26C and 24D and 26D of circuit 25 were specially allocated to the measurement of the ratio of the counting rates when an external standard source is brought into the presence of the sample. These channels may optionally be constituted by two of the channels used for the spectrometry of the sample. To this end it is merely necessary to give an appropriate value to the energies of the alpha or beta-source and the gamma-source. In the case where the first standard source comprises an alpha-source, the height of the pulses can be adjusted by interposing a shield between the source and the scintillator.

The external standardisation described hereinbefore is carried out in two stages, the first using a standard fluorescence source and the second using a gamma type source. However, it is also possible to carry out this external standardisation in a single stage by means of a composite external standard source which simultaneously emits fluorescent and gamma-radiation.

Figure 6:
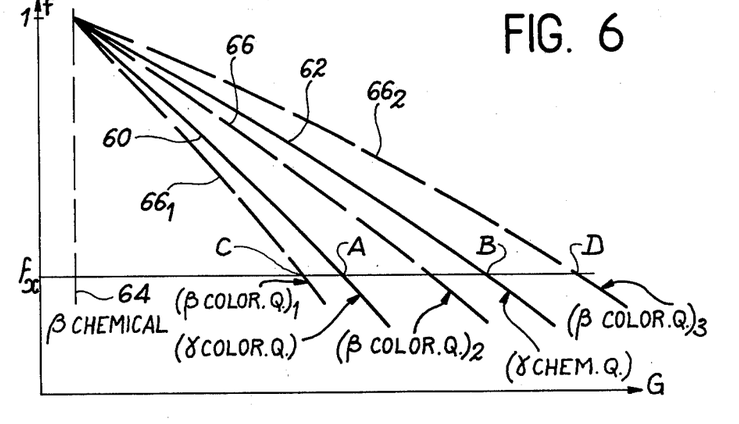
FIG. 6, standardisation curves in the case where the external standard source simultaneously emits an ionising radiation and a fluorescent radiation.

The diagram of FIG. 6 provides a better understanding of the principle of this variant of the invention. It shows (like FIG. 2) the external standardisation curves obtained with two standard sources in an axis system where the efficiency f is plotted on the ordinate and the ratio G of the counting rates on the abscissa. The solid line curves 60 and 62 represent the two external standardisation curves obtained with an external gamma-source in the case respectively of a colour quenching and a chemical quenching.

In the case of a system of samples having the same fluorescence efficiency $f_x$ but different colour and chemical quenchings, the representative point of each sample in the case of external gamma standardisation is located between the two points A and B of ordinate $f_x$. The precise positioning of the point on segment AB is dependent on the respective contributions of the two types of quenching present.

The calibration curves obtained after replacing the gamma-source by a fluorescent radiation source can be positioned in the following manner in such a diagram. Chemical quenching has no effect on the ratio G of the counting rates obtained with the fluorescence source in such a way that the corresponding calibration curve 64 in broken line form is a vertical line. The calibration curve 66 corresponding to purely colour quenching cannot be positioned with equal accuracy. Its position and configuration, particularly with respect to curves 60 and 62, are dependent on the average optical path length of the fluorescence photons through the sample. Therefore this position is dependent on instrument parameters. It can be assumed that the working point corresponding to the measuring efficiency $f_x$ is located between a point C and a point D. Therefore curve 66 is positioned between two extreme curves 66₁ and 66₂.

However, this uncertainty is not an obstacle to the single stage standardisation process because for the application thereof it is merely necessary for curve 66 to be located to the right of curve 64 which is always the case.

In this variant of the process a working point of ordinate $f_x$ is investigated which does not move when the relative contributions of chemical and colour quenching change between individual samples. This point exists for two reasons:

(1) When working with a single composite external source simultaneously emitting gamma and fluorescent radiation, the counting rates due to the gamma source and to the fluorescent source are additive in the measuring channels;

(2) in the case of gamma radiation the abscissa of the point in question is displaced to the right, whilst in the case of fluorescent radiation the abscissa of the same point is displaced to the left when in a series of samples with the same efficiency $f_x$ the quenching passes from a preponderance of the colour effect to a preponderance of the chemical effect.

Thus it is possible to find a composite source such that when the counting rate due to one of the sources increases in one channel, the counting rate due to the other source in the same channel decreases which leaves the ratio of the counting rates in both channels invariable and the point fixed.

As the variation between the gamma standardisation curves 60, 62 is smaller than the variation between curves 64, 66, it is possible to bring about the stabilisation of the working point by adding a fluorescent radiation source of suitable intensity.

Information will now be given on the nature and structure of the standard sources which can be used in the invention.

With respect to the first source it is desirable that the emission spectrum of the scintillator used is as close as possible to that of the liquid scintillator used in the samples to be measured. An ideal solution consists of using the same scintillator but in the plasticised state, for example, in the form of a polystyrene plate containing the scintillator in solid solution.

However, the analogy between the emission spectra of certain commercial products is sufficient to permit the use of scintillators of different types. For example, soluble scintillators marketed by the CIBA Company such as BBOT, Butyl PBO, PBBO have a spectrum which is very similar to the plastic scintillators marketed by the Nuclear Enterprise Company respectively NE102A or NE110 for the first, NE111 for the second and NE111 for the third.

It is possible to use a high energy beta or alpha source to produce scintillations in the first standard source. The energy must be high because the amplitude of the pulses supplied by the photomultipliers is dependent thereon, this being proportional to the number of photons reaching them. However, a relatively large loss of photons must be expected between the external scintillator and the photomultipliers. Possible alpha sources are, for example, Am-241 (or Pu-238) and as a possible beta source the couple Sr-90/Y-90.

Particular care must be taken with respect to the study of the optical path length through the sample between the external scintillation source and the photomultipliers. The penetration and diffusion of the radiation in the sample may in certain cases require external or internal frosting or dulling of the bottom of the dishes containing the sample. It must also be ensured that no fluorescent radiation passes from the source to the photomultipliers.

However, there is no need to worry about differences between individual dishes because calibration with the aid of the first source does not require a high level of measuring precision. Thus, the basic calibration is ensured as in conventional processes by the external gamma source. The object of the auxiliary calibration being merely to position the working point between the chemical and colour quenching curves. However, in practice the variation in the measuring efficiency as a function of the respective contributions of the two types of quenching does not exceed 5 to 10%. An error of 10% in the determination of the colour quenching therefore only causes an error of 0.5 to 1% in the efficiency.

Figure 7:
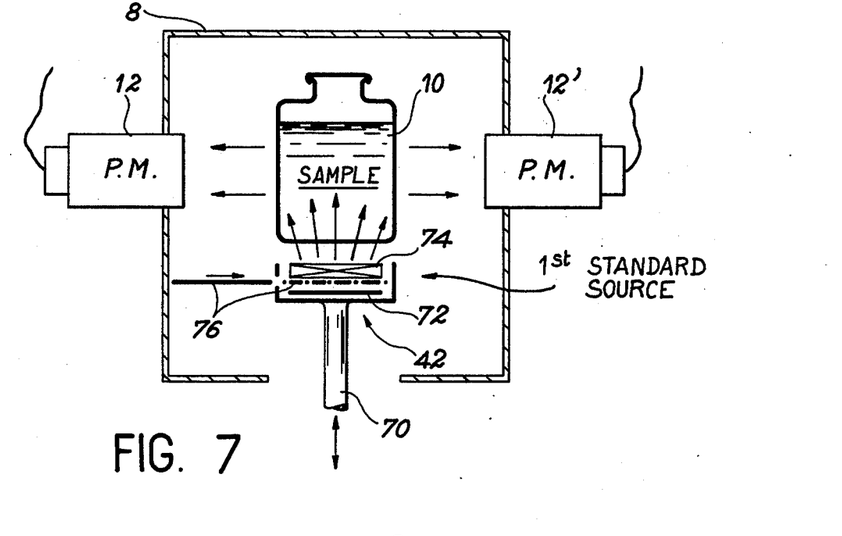
FIG. 7, diagrammatically a special way of realising a standard fluorescent scintillating source.

The standard source 42 shown in FIG. 7 is mounted on a retractable rod 70 and comprises a radioactive nuclide 72 of the alpha or beta type, a scintillator 74 and optionally a shield 76 which is installed when the source is in the inoperative position in order to prevent scintillator fatigue. The lower face of the latter can be metal-coated in order to improve the optical efficiency.

Figure 8:
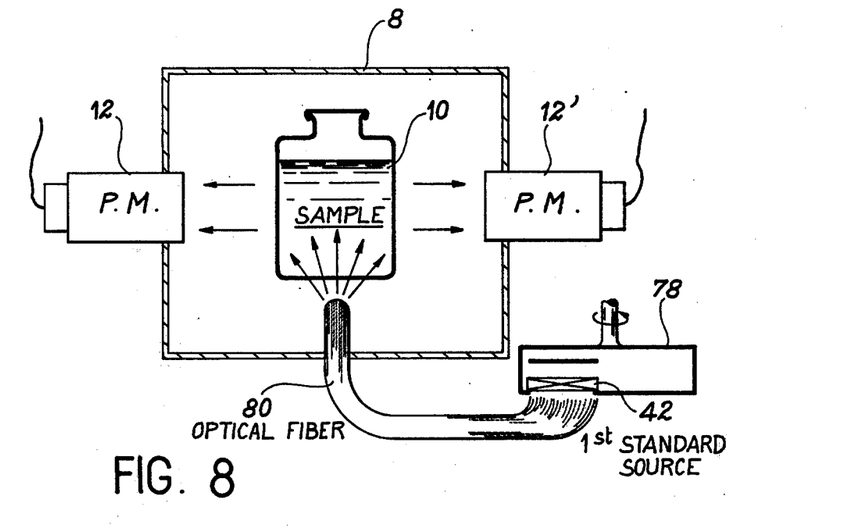
FIG. 8, another way of realising the standard fluorescent source in the case where it is positioned externally of the measuring chamber, the light which it emits being introduced into the chamber by an optical fibre.

The source shown in FIG. 8 is placed on a rotary plate 78 positioned outside measuring chamber 8 and the fluorescent radiation which it emits is introduced into said chamber by an optical fibre 80.

Figure 9:
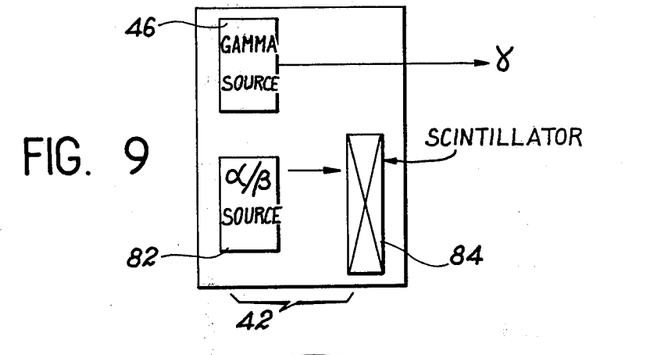
FIG. 9, a special way of realising a composite source emitting both ionising radiation and fluorescent radiation.

The composite source shown in FIG. 9 comprises a first scintillation source 42 and a second source 46 which emits gamma radiation. The first source comprises a radioactive nuclide 42 which emits alpha or beta radiation and a scintillator 84.

With such a source the photomultipliers detect two types of pulses which come from non-coinciding scintillations, namely those formed in external scintillator 84 and those formed due to the Compton's electrons produced in the sample by the gamma source.

Figure 10:
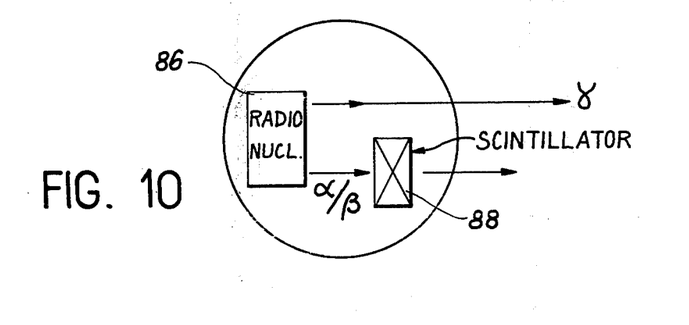
FIG. 10, a composite source having only a single radioactive nuclide.

The source shown in FIG. 10 comprises a single radioactive nuclide which emits alpha or beta radiation and gamma radiation. This radioactive nuclide can be, for example, Co60. The source also comprises a scintillator 88. With such a source the photomultipliers detect external and internal scintillations which partly coincide and which are due to simultaneous scintillations produced in external scintillator 88 and in the sample.

It is obvious that if necessary it would be possible to use a fluorescent radiation source which does not comprise a radioactive nuclide and a scintillator, for example, a pulsed electroluminscent source or a pulsed source emitting radiation of a sufficiently short wave length to be able to excite an external scintillator. In connection with these sources reference can be made to the article entitled "Light Pulse Generator in the Nanosecond Range" by G. Pfeffer et al. published in the Journal "Nuclear Instruments and Methods", Vol. 23, 1963, p. 74.

The invention is not limited to the embodiments described and represented hereinbefore and various modifications can be made thereto without passing beyond the scope of the invention.

What is claimed is:

1. A liquid scintillation spectrometry process for samples having a quenching of the fluorescent efficiency resulting more particularly from colour quenching, wherein said colour quenching is measured by the folowing operations:
- a first standard solution is prepared having no colour quenching;
- this first standard solution is exposed to a first standard external scintillation source which emits fluorescent radiation;
- the radiation which has passed through the first standard solution is subject to spectrometry;
- once and for all, one of the characteristics of the spectrum obtained is recorded and this constitutes a reference characteristic;
- the first standard solution is replaced by one of the samples to be measured;
- the sample is exposed to radiation from the first standard source;
- the radiation which has passed through the sample is subject to spectrometry;
- the characteristic of the spectrum obtained is measured;
- the measured characteristic is compared with the recorded reference characteristic, said comparison giving the colour quenching of the sample.

2. A liquid scintillation spectrometry process for samples having a quenching of the fluorescent efficiency resulting from an overall quenching comprising colour quenching and chemical quenching, wherein the colour quenching of each sample is determined by the operations of claim 1, and wherein the chemical quenching is determined by establishing the overall quenching of the sample by an overall calibration operation and then subtracting from the overall quenching the colour quenching proportion which gives the chemical quenching.

3. A process according to claim 2, wherein the chemical quenching is determined by the following operations:
- a second standard solution is prepared having neither colour quenching nor chemical quenching;
- this second standard solution is exposed to a second standard source emitting ionising radiation;
- spectrometry is effected on the radiation induced in the standard solution by the second standard source by measuring the counting rate of the scintillations in the different energy channels;
- one of the characteristics of the spectrum obtained is recorded once and for all and this constitutes a reference characteristic;
- the second standard solution is replaced by one of the samples to be measured;
- this sample is exposed to the second standard source;
- the scintillations emitted by the sample exposed to the second source undergo spectrometry;
- said characteristic of the spectrum is measured;
- the measured characteristic is compared with the recorded reference characteristic, said comparison giving the overall quenching of the sample;
- the colour quenching proportion is subtracted from the overall quenching giving the chemical quenching.

4. A process according to claim 3, wherein the characteristic of the spectrum which is recorded once and for all for the standard solutions and which is measured for the samples is constituted by the ratio of the counting rates obtained in two channels of different energy levels.

5. A process according to claim 4, wherein prior to the spectrometry of the samples calibration is carried out by the following operations:
- a plurality of calibration solutions are formed which contain a radioactive nuclide and a scintillator identical to those contained in the samples to be measured, but which also contain different known quantities of a purely chemical quencher and a purely colour quencher;
- each of the calibration solutions is exposed to the first standard source and then to the second standard source and the two ratios of the counting rates are measured for each solution;
- the correspondence between the quenching values of the solutions and the measured ratios are recorded.

6. A process according to claim 5, wherein the recording of the calibration results is performed digitally.

7. A process according to claim 3, wherein to carry out spectrometry a regulatable sensitivity system is used and wherein said sensitivity is utilised to compensate the effect of colour quenching and the effect of chemical quenching.

8. A process according to claim 7, wherein automatic action takes place on said sensitivity to reduce the measured counting rates to the reference counting rates.

9. A process according to claim 3, wherein the operations of exposing a sample to the first standard source and to the second standard source are simultaneous, and wherein the sample exposed to these two sources only undergoes spectrometry once.

10. A liquid scintillation spectrometry process for samples which may have a quenching of the fluorescence efficiency due to a colour quenching and to a chemical quenching, wherein:
- a first standard solution is formed which has no colour quenching;
- this first standard solution is exposed to a first standard source comprising a scintillator exposed to a radioactive nuclide and emitting a fluorescent radiation;
- the counting rates due to the fluorescent radiation transmitted by the standard solution are measured with the aid of a regulatable sensitivity spectrometry system comprising at least two different energy channels;
- the ratio of the counting rates is recorded once and for all and constitutes a first reference ratio;
- the standard solution is replaced by one of the samples to be measured and said sample is then exposed to the first standard source;
- by means of the same spectrometry system the ratio of the counting rates obtained in the two channels having different energies is measured;
- the ratio of the counting rates obtained is compared with the first reference ratio;
- the sensitivity of the spectrometry system is corrected to automatically reduce the ratio obtained with the sample to the value of the first reference ratio;
- a second standard solution is formed having no chemical quenching;
- this second standard solution is exposed to a second standard source which emits an ionising radiation;
- the counting rate of the scintillations in the two channels having different energies is measured;
- the ratio of the counting rates obtained in the two channels with different energies is recorded and this constitutes a second reference ratio;

the second standard solution is replaced by the sample to be measured which is then exposed to the ionising radiation of the second standard source;

the ratio of the counting rates obtained in the two channels having different energies is measured by using the same spectrometry system;

the ratio of the counting rates obtained is compared with the second reference ratio;

the sensitivity of the spectrometry system is corrected in order to automatically reduce the measured ratio to the value of the second reference ratio;

the second standard source is removed;

the sample undergoes spectrometry with the aid of the doubly corrected spectrometry system.

11. A liquid scintillation spectrometer for a plurality of samples having a quenching of the fluorescent efficiency resulting from colour quenching and chemical quenching, wherein it comprises:

a measuring chamber;

means for introducing the samples to be measured successively into the said chamber;

a spectrometry system comprising at least one photomultiplier positioned in front of said chamber and supplying pulses directed towards a counting circuit with several different energy channels;

a circuit for measuring one of the characteristics of the spectrum measured by the spectrometry system, said circuit supplying a measuring voltage;

this apparatus also comprises:

a first standard scintillation source emitting fluorescent radiation which is associated with means for introducing the radiation into the measuring chamber;

a first standard solution having no colour quenching;

a first regulatable reference voltage generator which can be regulated to supply a first reference voltage equal to that supplied by the measuring circuit when the first solution is exposed to the first standard source;

a first comparator with two inputs, one being connected to the first reference voltage generator and the other to the measuring circuit, said comparator supplying a signal which is directly linked with the colour quenching;

a standard source emitting an ionising radiation associated with means for introducing said source into the measuring chamber;

a second standard solution having no quenching;

a second regulatable reference voltage generator being regulated to supply a second reference voltage identical to that supplied by the measuring circuit when the second standard solution is exposed to the second standard source;

a second comparator with two inputs, one connected to the second reference voltage generator and the other to the measuring circuit, said second comparator supplying a signal which is directly linked with the overall quenching of the sample.

12. A spectrometer according to claim 11, wherein the measuring circuit comprises two counting channels having different energies and a circuit for calculating the ratio of the counting rates obtained in the two channels.

13. A spectrometer according to claim 12, wherein each of the two comparators has an output connected to a circuit for controlling the power supply of the photomultipliers.

14. A spectrometer according to claim 11, wherein the first standard source comprises a scintillator in a solid matrix and exposed to an alpha or beta radiation source.

15. A spectrometer according to claim 14, wherein the samples to be measured and the first standard source comprise the same scintillator.

16. A spectrometer according to claim 14, wherein the first standard source is positioned outside the measuring chamber and is associated with an optical fibre permitting the introduction of the radiation emitted by the source into the measuring chamber.

17. A spectrometer according to claim 11, wherein the first standard source comprises a pulsed electroluminescent source.

18. A spectrometer according to claim 11, wherein the second standard source which emits an ionising radiation is a gamma source.

19. A spectrometer according to claim 11, wherein said first and second standard sources comprise a single source having a radioactive nuclide simultaneously emitting gamma radiation and alpha or beta radiation and a scintillator exposed to said alpha or beta radiation.

* * * * *